April 3, 1956   C. K. STILLWAGON   2,740,423
DISC VALVE

Filed March 15, 1952   2 Sheets-Sheet 1

CRAWFORD K. STILLWAGON
*INVENTOR.*

BY Browning & Simms

ATTORNEYS

April 3, 1956 C. K. STILLWAGON 2,740,423
DISC VALVE
Filed March 15, 1952 2 Sheets-Sheet 2
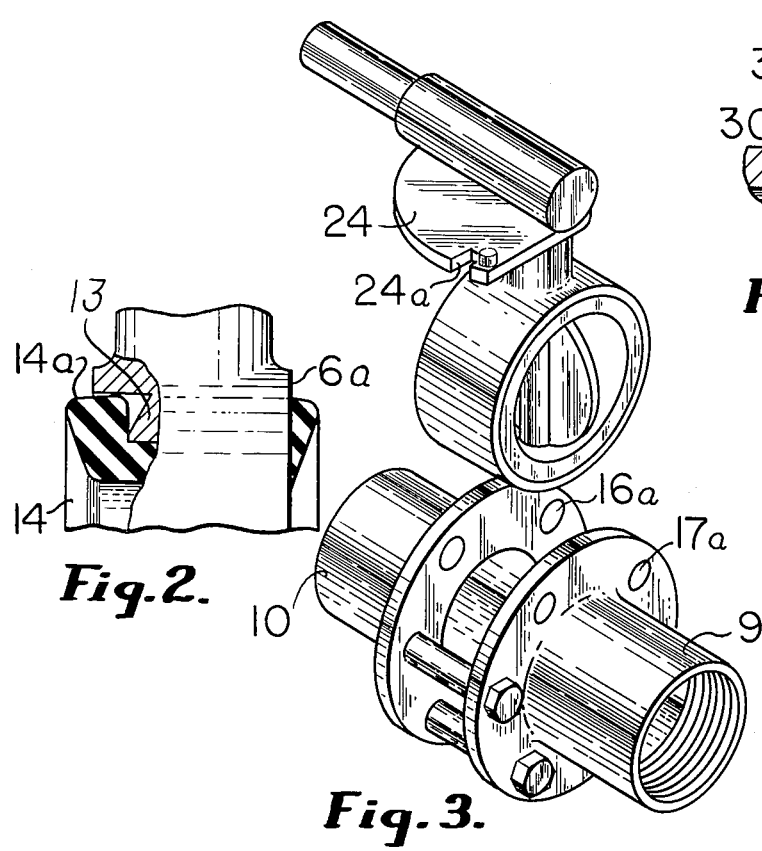
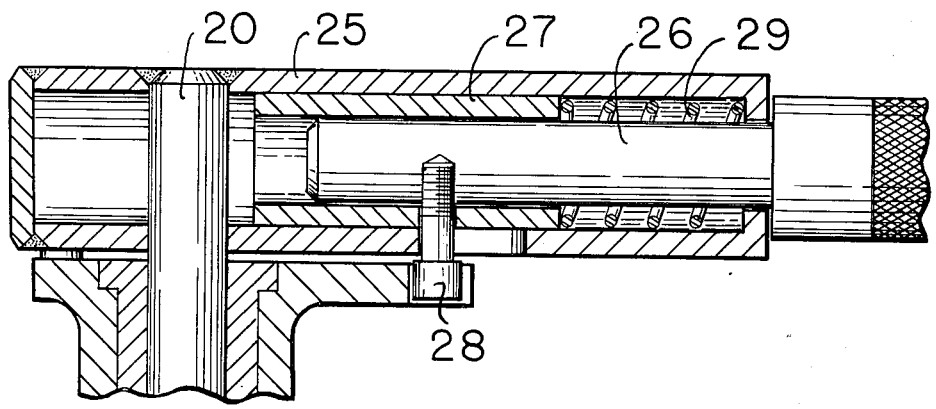
CRAWFORD K. STILLWAGON
*INVENTOR.*
BY Browning & Simms
ATTORNEYS

United States Patent Office 2,740,423
Patented Apr. 3, 1956

2,740,423

DISC VALVE

Crawford K. Stillwagon, Houston, Tex.

Application March 15, 1952, Serial No. 276,775

17 Claims. (Cl. 137—454.2)

This invention relates to the improvements in valves and refers more particularly to valves of the character known as butterfly or disc type valves.

The valve of this invention is particularly adaptable for use in the lower pressure ranges up to approximately 150 p. s. i. and even higher, and the valve is usable in suction lines as well. In such valves, it is particularly desirable that the valve be economical, readily installed in a conduit to be controlled, easily maintained by a replacement of the wearable parts without disturbing the fittings for securing the valve in a conduit and one wherein a minimum number of parts are required and which yet permits the valve to be installed with different types of fittings, that is welded end, flange end, screw end and the like, in a conduit. Also, the valve should be of a self-cleaning variety and difficulty has heretofore been encountered in providing a positive seal between the valve member and the body so as to prevent leakage in use.

An object of this invention is to provide a simple valve in which a minimum number of moving parts are employed and which is versatile in that it may be secured in a conduit in any of the usual manners without the requirement of special parts other than the particular fittings used for this purpose.

Another object is to provide a valve of the character described in which the valve body may be replaced without requiring removal of all of the usual bolts normally encountered in such valves.

Another object is to provide a valve of the character described in which the valve body which carries the resilient seal member and valve disc can be very quickly changed in the event of failure due to wear of the parts.

Another object is to provide a valve of the character described which is full opening and self-cleaning.

Another object is to provide a valve of the character described in which a resilient seat member is positively held in position without the necessity of bonding to the valve body so that the seat member is readily replaceable and yet the valve may be used in suction as well as pressure systems.

Another object is to provide in this type of valve a resilient seat member which is positively held in place both for use of the valve in pressure or suction systems without the use of auxiliary clamping means for securing the seat.

Another object is to provide in this type of valve a resilient seat member which is a continuous web of resilient material arranged relative to the valve body, the valve disc, and the fittings for securing the valve body in a conduit so as to provide a positive three-way seal between the valve body and the disc valve, the valve body and the valve stem, and the valve body and the fittings.

Another object is to provide in valves of this class a long life resilient seat member which is maintained under compression upon assembly of the valve whereby distortion of the seat by the valve disc due to opening and closing movement of the disc does not place the material of the seat under undue tensional forces.

Other and further objects of the invention will appear as the description proceeds.

In the drawings which are to be read in conjunction with the instant specification and which constitute a part thereof, and wherein the same parts will be designated by like numerals in the various views:

Fig. 2 is a fragmentary view, partially in section and partially in elevation, illustrating a portion of the valve body and its associated seat, of the valve shown in Fig. 1;

Fig. 3 is a perspective, partially exploded view of the device shown in Fig. 1, illustrating the manner in which the valve body may be removed from the flange fittings without the requirement that all of the bolts between the fittings be removed;

Fig. 4 is a view upon an enlarged scale illustrating the handle of the device shown in Figs. 1 and 3 in vertical cross-section; and Fig. 5 is a fragmentary view illustrating a modified form of flange fitting.

Figure 1:
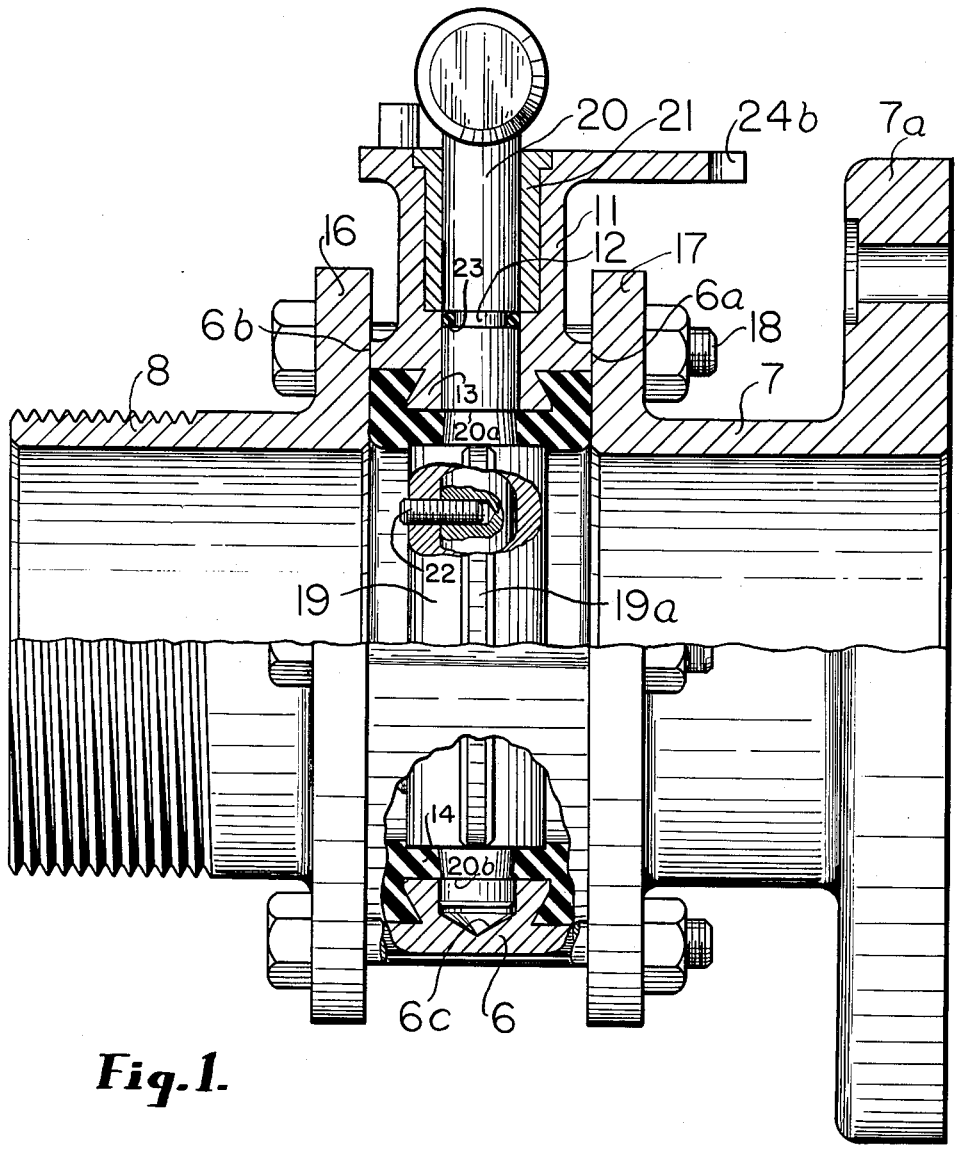
Fig. 1 is an elevational view partially in vertical cross-section illustrating a valve embodying this invention.

The valve of this invention may be considered generally as constituting three principal parts, the body 6, end or flange fittings 7 and 8, and a resilient seat 14. The end fittings are for the purpose of securing the valve in a conduit and as illustrated, the end fittings may be of the various usual types, namely, the flange fitting 7, the external screw threaded fitting 8, and by reference to Fig. 3, there is seen an internal screw threaded fitting 9 and a weld fitting 10. These end or flange fittings are such as to require a minimum inventory of stock for the different flange fittings 8, 9 and 10 can all be made from a single blank, as will be readily appreciated. The flange fitting 7 can be fabricated from similar blanks by welding the flange 7a to the end of the blank or the fitting may be formed integrally from a separate casting, forging or the like.

Referring to the body 6, it is seen to comprise a substantially tubular part with an upstanding neck 11 formed thereon to accommodate the valve stem 20. Internally of the body is formed a rib or dovetail tongue 13. The sides of the rib are undercut so as to give this dovetail configuration and this configuration extends circumferentially about the inside of the valve body. This rib is positioned substantially midway of the length of the tubular body and leaves internal cylindrical surfaces on the body at each side of the rib. The end edges 6a and 6b of the tubular body constitute imperforate abutment faces which are adapted to be frictionally engaged by the flange fittings to secure the body therebetween, in a manner to be more fully hereinafter described.

Internally of the tubular body 6 is positioned a resilient seat 14. This seat is annular in shape, is not bonded, cemented or otherwise secured to the body, but is provided with a groove to closely fit the cylindrical inner surface of rib 13 of the body. This seat comprises an annular web of resilient material, preferably neoprene, rubber, or other synthetics with hycar constituting the preferred material for use with oily and gritty substances. This material preferably is relatively soft with a durometer value within the range of between 35 to 40 having been found to be very satisfactory.

Referring to Fig. 2, the shape of seat 14 when relieved or not under compression is readily seen. This web of material, of course, has the central passage therethrough and the length of the tubular or annular web is somewhat greater than the length of the tubular body so that the ends of the resilient material extend somewhat beyond the end edges 6a and 6b of the body. The flange end portions extend radially to substantially the cylindrical surfaces of the body at the sides of the rib. The outer edge 14a of the seat may be rounded to present a curved surface to the flange fittings when the valve is made up. With this arrangement, the seat member may be pressed inwardly by the flange fittings upon assembly of the valve and the slight voids extending circumferentially about the web of the material will be filled by the material of the seat flowing under pressure into the voids because the volume of the flange end portions of the seat is somewhat greater than the volume of the space provided by the grooves forming the rib and the abutment faces of the flange fittings. Nevertheless, these voids provide a space to accommodate this flow of sealing material, reducing the likelihood of any of the material being forced between the abutment surfaces of the flange fittings and the abutment faces 6a and 6b of the body. This assures a solid metal-to-metal abutment between the flange fittings and the body.

Preferably the flange end portions of the seat are tapered somewhat outwardly from a true radius as indicated in Fig. 2, and this construction provides these voids plus a hinging action so that initial abutment of the flanges against the surfaces 14a sets up forces to insure packing of all voids with the seal material. These forces also are in a direction to resist flow of the seal material between the abutment surfaces of the body and flange fittings.

Referring more particularly to the flanges 7 and 8, it will be seen that they have upstanding flange parts 16 and 17 which extend radially and provide abutment faces on their end surfaces to frictionally engage the abutment faces 6a and 6b on the ends of the tubular body. These abutment faces upon the flanges 16 and 17 may be plane surfaces. These flanges also provide at their outer extremities parts which are perforated as at 16a and 17a to receive fastening means or bolts 18 for securing the flange fittings together with the body held or clamped therebetween. These parts for receiving the bolts are radially beyond the abutment faces and have at least as great a distance between them as the length of the tubular body so that the body may be moved sidewise into and out of position between the flanges when the flanges are made up in the conduit. All of the fastening means or bolts 18 extend exteriorly of the body so that the body may be removed from between the flange fittings and replaced therein with only approximately one-half of the bolts being removed although it will usually be necessary to slacken up or loosen up the other bolts slightly and to slightly spring the flange fittings apart. It will be readily appreciated that with this arrangement the body may be quickly and easily replaced in the event of wear of any of the parts or leakage past the valve member. The hinge action of the flange ends of the seat facilitate this make up and break down of the valve with a minimum of interference.

The internal diameter of the flange fittings is substantially the same as the internal diameter of the resilient seat 14 when the valve is made up. Thus, these flanges also provide abutment faces for frictionally and sealingly engaging the end portions of the seat. When the bolts 18 and their associated nuts are tightened, the flanges are brought together and this places the seat under compression causing the material thereof to flow inwardly to tightly fill the space about the undercut rib 13, thus firmly holding the flange in position. The abutment faces on the flanges 16 and 17 need not be carefully ground or polished and, thus, provide good frictional engagement with the resilient material of the seat as well as the abutment faces of the body to securely hold both the body and seat in place therebetween. Thus, the seat is securely held in place whether the conduit controlled is used in a suction line or in a pressure system.

The bolts 18 all extend exteriorly of the periphery of the body and serve to essentially center the body between the flange fittings. The arrangement of the bolts is such as to provide slight play between the periphery of the body and the periphery of the bolts but the bolts do center the body within rought limits or tolerance.

The seat, it will be seen, provides a seal between the body and the flange fittings, and it is also arranged to provide a seal about the disc or butterfly valve member 19. To accomplish this, the seat is so constructed and arranged that upon assembly of the valve the internal diameter of the seat is somewhat smaller than is the external diameter of the valve disc at its edge 19a. Thus, the edge 19a engages and slightly compresses the resilient seat about the entire perimeter of the valve disc when the valve disc is in closed position. The particular differential in diameters between the disc and seat is not particularly critical but should be sufficient to insure that the disc makes a tight engagement around its full circumference with the seat. As examples of what has been found to be a proper relationship between these two diameters for a 3-inch valve, a differential of diameters of $1/8$ inch has been found to be satisfactory. On the other hand, as the diameter of the valve increases, this differential in diameters between the valve disc and the I. D. of the seat should increase slightly. As an example, when the valve is a 10-inch valve, a differential of diameters from $3/16$ to $1/4$ inch has been found to be satisfactory. The I. D. of the seat will be slightly decreased when the valve is made up in the line due to the compression of the seat as the flanges 16 and 17 are brought together by the bolts and their associated nuts. This should be allowed for in fabricating the resilient seat.

The valve disc is mounted upon a stem 20 which extends substantially perpendicular to the longitudinal axis of the passage through the flange fittings and valve body. The body is apertured to receive the stem, the aperture at the upper end extending completely through the valve body and neck 11. The neck is counterbored to receive a bronze wear-sleeve or bushing 21. A seal is provided about the stem by the seat 14 which is also apertured to receive the stem. To further perfect this seal about the stem, the stem may be turned to form a tapered groove providing an annular inwardly facing shoulder 20a which receives the resilient sealed material of the seat. At its lower end the stem may be provided with a similar groove to provide a similar annular inwardly facing shoulder 20b.

The body is provided with a recess 6c to accommodate the lower end of stem 20. A separate wear ring may be provided between the body and the lower end of the stem, but it has been found that this is usually not necessary because the stem is actually held in a floating position by the resilient seat 14. The resilient material of seat 14 is always maintained under compression immediately surrounding the stem 20 by the circularly shaped ends of the thickened portion of the valve disc 19.

The valve disc 19 is bored to receive the stem 20 and is secured thereto by a plurality of set screws 22.

As a precaution against leakage about the stem through neck 11 and to keep dust, grit and the like from finding its way between the stem and the valve seat which might cause undue wear upon the stem, the stem may be grooved as at 12 to receive an O-ring 23.

Any suitable handle may be secured to the upper end of the stem, but it is usually preferable to provide a handle arrangement which will securely lock the valve member in its extreme open and extreme closed positions. This is readily accomplished, as best shown by Fig. 3, by providing the upper portion of the neck with a metal plate 24. This plate 24 may be provided with two openings 24a and 24b shown respectively in Figs. 3 and 1. The notch 24b corresponds to full open position, and the notch 24a corresponds to full closed position. Referring to Fig. 4, a convenient handle is shown in detail. The handle comprises a casing 25 welded to the upper end of stem 20. The casing is essentially tubular and receives with a sliding fit the pin end of handle 26. This end of the handle 26 fits a sleeve 27 and is secured thereto by set screw 28. A spring 29 urges the sleeve 27 toward stem 20 so that the head of set screw 28 will engage the notches 24a and 24b when it registers with one of them. This locks the valve handle and stem and disc valve in a position to hold the disc valve either in fully open or fully closed position. Handle 26 has a knurled handle at its outer end to facilitate manipulation of the valve.

A modification shown in Fig. 5 is substantially the same as that shown in the other figures of the drawings. However, the flange fitting 30 is somewhat modified in that a groove 30a is provided in the abutment face of the flange adjacent the resilient seat. Two such grooves may be provided and the material of the seat flows into the grooves on assembly of the valve. The resilient material compressed into such grooves further locks the material in place and this is of particular advantage where the valve is to be used in conjunction with a conduit in a suction system.

It is believed that the operation of the valve of this invention is apparent from the foregoing description. It will be seen that there has been provided a butterfly or disc valve in which the construction is simple and a minimum of machining is required. The valve body, resilient seat, valve disc, stem, and handle may all be manufactured and inventoried as standard parts for use with different flange fittings so that an operator having several different installations, some of which employ flange fittings, others weld end fittings, and still others internal and external screw web fittings, may keep on hand a minimum number of spare valve body parts which are readily usable with the various types of fittings. The arrangement of the body between the flange fittings is such that only a portion of the securing nuts and bolts need be removed to permit replacement of the valve body or seat. The remaining bolts and nuts need be merely slackened off. The construction is such that the bolts serve as centering means to facilitate assembly of the device. There has been provided a novel seal arrangement in which a single resilient seat member is employed to seal about the valve disc so that the valve is leak proof and also seals between the valve stem and valve body and the valve body and the flange fittings.

As many possible modifications of the apparatus may be made embodying the invention, the matter herein set forth should be interpreted as illustrative only and not by way of limitation, the scope of the invention being defined solely by the claims appended hereto.

Many subcombinations of the invention have utility when employed independently of the entire combination, and it is contemplated that they may be employed independently in the manner set forth in the appended claims.

The invention having been described, what is claimed is:

1. A disc valve comprising, a tubular body having a dovetail type annular rib extending radially inward about midway the length of the body, flange members having metal-to-metal abutment with the ends of the body and providing fittings for securing the valve within a conduit, means securing the flange members in abutment with the body ends, a disc valve member rotatably mounted within the body for controlling flow therethrough, an annular resilient seat having end portions adapted to fill the space between the dovetail rib and the flange members when the seat is under compression, said seat being so constructed and arranged relative to the body and flange fittings and the body and disc as to be under compression between the body rib and each flange member and the body and the disc when the latter is in closed position.

2. A disc valve comprising, a tubular body having annular undercut surfaces about its inner periphery at its edges, an annular resilient seat carried by the body, flange fittings, one disposed at each end of the body having annular abutment faces for frictional engagement with the body and sealing engagement with the adjacent portions of the resilient seat, said seat when the valve is dismantled extending axially somewhat beyond the ends of the body and having end portions adjacent the undercut surfaces each of greater volume than the volume of the respective spaces, with the valve assembled, between the flanges and the undercut surfaces of the body, said end portions when the valve is assembled being forced under compression into and filling the said spaces, a valve disc member rotatably mounted in the body cooperable with the seat to control flow through the body, radially extending parts carried by the flange fittings and means extending between said parts to secure the flange fittings, the seat and the body in assembled relationship.

3. A disc valve comprising, a tubular body having annular undercut surfaces about its inner periphery at its edges, an annular resilient seat carried by the body, flange fittings, one disposed at each end of the body having annular abutment faces for frictional engagement with the body and sealing engagement with the adjacent portions of the resilient seat, said seat when the valve is dismantled extending axially somewhat beyond the ends of the body and having end portions adjacent the undercut surfaces each of greater volume than the volume of the respective spaces, with the valve assembled, between the flanges and the undercut surfaces of the body, said end portions when the valve is assembled being forced under compression into and filling the said spaces, a valve disc member rotatably mounted in the body cooperable with the seat to control flow through the body, said disc when in closed position being entirely contained within the body, radially extending parts carried by the flange fittings and means extending between said parts and exterior of said body to secure the flange fittings, the seat and the body in assembled relationship.

4. The valve of claim 3 wherein each of the abutment faces of the flange fittings is formed with an annular groove to receive a part of the adjacent end portion of the seat upon assembly of the disc valve.

5. A disc valve comprising, a tubular body having annular undercut surfaces about its inner periphery at its edges, an annular resilient seat carried by the body, flange fittings, one disposed at each end of the body having annular abutment faces for frictional engagement with the body and sealing engagement with the adjacent portions of the resilient seat, said seat when the valve is dismantled extending axially somewhat beyond the ends of the body and having end portions adjacent the undercut surfaces each of greater volume than the volume of the respective spaces, with the valve assembled, between the flanges and the undercut surfaces of the body, said end portions when the valve is assembled being forced under compression into and filling the said spaces, a valve disc member rotatably mounted in the body cooperable with the seat to control flow through the body, the outer diameter of the disc being larger than the inner diameter of the seat whereby the seat is compressed between the body and the disc about the entire edge of the disc when the disc is in a fully closed position, radially extending parts carried by the flange fittings and means extending between said parts to secure the flange fittings, the seat and the body in assembled relationship.

6. A disc valve comprising, a tubular body having annular undercut surfaces about its inner periphery at its edges, an annular resilient seat carried by the body, flange fittings, one disposed at each end of the body having annular abutment faces for frictional engagement with the body and sealing engagement with the adjacent portions of the resilient seat, said seat when the valve is dismantled extending axially somewhat beyond the ends of the body and having end portions adjacent the undercut surfaces each of greater volume than the volume of the respective spaces, with the valve assembled, between the flanges and the undercut surfaces of the body, said end portions extending substantially radially relative to the tubular axis of the body, but tapered somewhat outwardly relative to the undercuts of the body whereby the flange fittings during assembly will first engage the extremities of the end portions and force the end portions into engagement with the undercut surfaces of the body, a valve disc rotatably mounted in the body cooperable with the seat to control flow through the body, the outer diameter of the disc being larger than the inner diameter of the seat whereby the seat is compressed between the body and the disc about the entire edge of the disc when the disc is in a fully closed position, radially extending parts carried by the flange fittings and means extending between said parts to secure the flange fittings, the seat and the body in assembled relationship.

7. A disc valve comprising, a tubular body having annular undercut surfaces about its inner periphery at its edges, an annular resilient seat carried by the body, flange fittings, one disposed at each end of the body having annular abutment faces for frictional engagement with the body and sealing engagement with the adjacent portions of the resilient seat, said seat when the valve is dismantled extending axially somewhat beyond the ends of the body and having end portions adjacent the undercut surfaces each of greater volume than the volume of the respective spaces, with the valve assembled, between the flanges and the undercut surfaces of the body, said end portions when the valve is assembled being forced under compression into and filling the said spaces, stem means mounted in the body for rotation about an axis normal to the tubular axis of the body and extending through the seat at two points, said stem means at its points of engagement with the seat having tapering grooves to provide inturned shoulders, the stem receiving apertures of the seat being of a smaller diameter than the diameter of said grooves, a disc carried by said stem means adapted to co-act with the seat to control flow through the valve, the outer diameter of the disc being larger than the inner diameter of the seat whereby the seat is compressed between the body and the disc about the entire edge of the disc when the disc is in a fully closed position, radially extending parts carried by the flange fittings and means extending between said parts to secure the flange fittings, the seat and the body in assembled relationship.

8. A tubular body, an annular inturned dovetailed tongue formed centrally of the body, the length dimensions of the tongue leaving inner cylindrical surfaces extending at each end of the body, the end faces of the body providing abutment faces to facilitate assembly of the body in a conduit, a seat member formed of resilient sealing material having a tubular central web whose outer periphery is formed to closely fit the cylindrical periphery of the dovetail tongue, outturned flange ends formed on the web extending substantially to the inner cylindrical surfaces of the body, the volume of resilient material in each flange end being somewhat greater than the volume of the respective annular spaces defined by the respective cylindrical surfaces of the body, the sides of the dovetail tongue, planes including the abutment faces of the body and an imaginary cylinder formed by an extension of the cylindrical surface of the tongue were such imaginary cylinder extended to intersect said planes.

9. The subcombination of claim 8 in which the outer faces of the flange ends of the seat are tapered outwardly so as to extend axially beyond the abutment faces.

10. The subcombination of claim 8 in which the outer faces of the flange ends of the seat are tapered outwardly so as to extend axially beyond the abutment faces, valve stem means mounted in the body for rotation about an axis transverse to the tubular axis of the body and extending through the seat at two points, and a disc carried by the valve stem means adapted to co-act with the seat to control flow of fluids through the body, the outer diameter of the disc being larger than the inner diameter of the seat whereby the seat is compressed between the body and the disc when the disc is in a fully closed position.

11. The subcombination of claim 10 wherein the stem means is arranged normal to the tubular axis of the body, and at its points of engagement with the seat is provided with tapering grooves to provide inturned shoulders.

12. A disc valve comprising, a first tubular member having an annular undercut surface about its inner periphery at one end face of the member, an annular resilient seat in the tubular member having a portion received in the space formed by the undercut surface, a second tubular member having an annular abutment face for frictional engagement with the first tubular member and sealing engagement with the adjacent portion of the resilient seat, said seat when the valve is dismantled extending axially beyond the end of the tubular member provided with the undercut surface, said seat when the valve is assembled being forced under compression into and filling the space provided by the undercut surface, a valve disc member rotatably mounted in the member and cooperable with the seat to control flow through the member, and means for securing the tubular members and seat in assembled relationship.

13. A disc valve comprising, a tubular body, a disc mounted in the body for rotation to control flow through the body, said disc when in closed position being entirely contained within the body, flange fittings disposed at each end of the body, annular abutment faces on the flange fittings for frictional engagement with the body, the confronting body ends and abutment faces residing substantially in planes transverse to the tubular axis of the body, radially extending parts carried by the flange fittings, said radially extending parts being spaced apart a distance at least substantially as great as the dimension of the body in the direction of its tubular axis, and means extending between said parts and exterior of said body to secure the flange fittings and the body in frictional engagement, parts on said last means and surfaces on the periphery of the body cooperable upon assembly of the valve to facilitate a rough centering of the body in operable position within the flange fittings but providing loose accommodation of the body upon assembly.

14. A disc valve comprising, a tubular body, a disc mounted in the body for rotation to control flow through the body, said disc when in closed position being entirely contained within the body, flange fittings disposed at each end of the body, annular abutment faces on the flange fittings for frictional engagement with the body, the confronting body ends and abutment faces residing substantially in planes transverse to the tubular axis of the body, radially extending parts carried by the flange fittings, said radially extending parts being spaced apart a distance at least substantially as great as the dimension of the body in the direction of its tubular axis, and bolt means extending between said parts and exterior of the body to secure the flange fittings and the body in frictional engagement, said bolt means being arranged circumferentially about the body to provide a rough centering of the body between flange fittings, the body fitting within the bolt means so as to have slight play therein, whereby it is easily assembled in place, but is roughly centered by the bolts.

15. A disc valve comprising, a tubular body, a disc mounted in the body for rotation to control flow through the body, said disc when in closed position being entirely contained within the body, hollow flange fittings disposed at the ends of the body, each fitting having an annular face abutting the body and extending beyond the outer periphery thereof and extending in a plane transverse of the tubular axis of the body, said body ends residing in corresponding transverse planes, means extending between said faces and exterior of the body to secure the flange members and the body in frictional engagement, parts on said last means and surfaces on the periphery of the body cooperable upon assembly of the valve to facilitate a rough centering of the body in operable position within the flange fittings but providing loose accommodation of the body upon assembly.

16. In a disc valve, a tubular body having annular undercut surfaces about its inner periphery at its edges, the inner periphery of the body being substantially cylindrical, the length dimension of the inner periphery being less than the length dimension of the outer periphery of the body and the undercut surfaces being such as to provide inner surfaces extending at each end of the body and radially outwardly of the annular undercuts, the end faces of the body providing abutment faces to facilitate assembly of the body in a conduit, a seat member formed of resilient sealing material having a tubular central web whose outer periphery is formed to closely fit the inner cylindrical periphery of the body, out-turned flange ends formed on the web extending substantially to the inner surfaces extending at each end of the body, the volume of resilient material in each flange end being somewhat greater than the volume of the respective annular spaces defined by the respective surfaces extending at the ends of the body, the sides of the annular undercuts, planes including the abutment faces of the body, and an imaginary cylinder formed by an extension of an inner cylindrical surface of the body were such imaginary cylinder extended to intersect said planes.

17. The combination of claim 16 wherein a valve disc is rotatably mounted within the seat member and is adapted to co-act with the seat member to control flow of fluids through the body, the outer diameter of the disc being larger than the inner diameter of the central web of the seat member whereby the seat member is compressed between the body and the disc when the disc is in a fully closed position.

References Cited in the file of this patent

UNITED STATES PATENTS

| | | |
|---|---|---|
| 1,113,570 | Motsinger | Oct. 13, 1914 |
| 1,164,033 | Thomason | Dec. 14, 1915 |
| 1,977,351 | Phillips | Oct. 16, 1934 |
| 2,385,510 | Harwood | Sept. 25, 1945 |
| 2,600,497 | Hamer | June 17, 1952 |

FOREIGN PATENTS

| | | |
|---|---|---|
| 670,327 | Germany | 1939 |